US012773641B2

(12) United States Patent
Migliacci

(10) Patent No.: US 12,773,641 B2
(45) Date of Patent: Oct. 27, 2026

(54) ADJUSTABLE POMMEL FOR A RIDE VEHICLE SEAT

(71) Applicant: Universal City Studios LLC, Universal City, CA (US)

(72) Inventor: Rachel Nicole Migliacci, Windermere, FL (US)

(73) Assignee: Universal City Studios LLC, Universal City, CA (US)

( * ) Notice: Subject to any disclaimer, the term of this patent is extended or adjusted under 35 U.S.C. 154(b) by 601 days.

(21) Appl. No.: 18/126,800

(22) Filed: Mar. 27, 2023

(65) Prior Publication Data

US 2024/0325938 A1 Oct. 3, 2024

(51) Int. Cl.
*A63G 31/02* (2006.01)
*B60R 21/00* (2006.01)
*B60R 21/015* (2006.01)
*B60R 21/26* (2011.01)

(52) U.S. Cl.
CPC ........ *A63G 31/02* (2013.01); *B60R 21/01516* (2014.10); *B60R 21/26* (2013.01); *B60R 2021/0097* (2013.01)

(58) Field of Classification Search
CPC .... A63G 31/02; B60R 21/01516; B60R 21/26
See application file for complete search history.

(56) References Cited

U.S. PATENT DOCUMENTS

| | | | | |
|---|---|---|---|---|
| 5,433,153 | A | 7/1995 | Yamada | |
| 6,901,617 | B2 | 6/2005 | Sprouse et al. | |
| 7,204,559 | B2 | 4/2007 | Berra | |
| 10,104,968 | B2 | 10/2018 | Alvarez et al. | |
| 10,226,129 | B2 | 3/2019 | Christianson et al. | |
| 11,491,895 | B2 | 11/2022 | Mizoi et al. | |
| 2002/0135219 | A1 | 9/2002 | Rogers | |
| 2011/0180669 | A1 * | 7/2011 | Johnson | 244/158.3 |
| 2018/0326311 | A1 | 11/2018 | Masterson et al. | |
| 2019/0291013 | A1 | 9/2019 | Cortelyou et al. | |
| 2020/0238874 | A1 | 7/2020 | Mazzucchelli | |
| 2020/0282878 | A1 | 9/2020 | Gandhi et al. | |
| 2022/0203868 | A1 | 6/2022 | Hsu | |
| 2022/0305971 | A1 | 9/2022 | Makiguchi et al. | |

OTHER PUBLICATIONS

Humpries, "Toyota Created a Shape-Changing Car Seat," Nov. 27, 2017, PC Mag, https://www.pcmag.com/news/toyota-created-a-shape-changing-car-seat , Last accessed Mar. 27, 2023.
PCT/US2024/019188 International Search Report and Written Opinion mailed Jun. 21, 2024.

* cited by examiner

*Primary Examiner* — Anthony D Barfield
(74) *Attorney, Agent, or Firm* — Fletcher Yoder, P. C.

(57) ABSTRACT

A ride vehicle system includes a seat configured to support a guest in a ride vehicle. The seat includes a seat pan, and an adjustable pommel integrated with the seat pan, where the adjustable pommel is configured to transition between an extended configuration and a retracted configuration.

20 Claims, 7 Drawing Sheets

ADJUSTABLE POMMEL FOR A RIDE VEHICLE SEAT

BACKGROUND

The present disclosure relates generally to the field of amusement parks. More specifically, embodiments of the present disclosure relate to systems for an adjustable pommel used for containing guests inside the amusement park-style rides.

Most amusement park-style rides include a ride vehicle that carries passengers along a ride path, for example, a track. Over the course of the ride, the ride path may include a number of features, including tunnels, turns, ups, downs, loops, and so forth. Even though a typical amusement park ride that includes a combination of these and other features may only last a few minutes, while the ride is operating, riders may be subject to forces that may move them out of proper positioning or orientation within the ride vehicle. As such, it is desirable to comfortably restrain and contain passengers in a ride vehicle seat while the ride is in operation. However, the use of standard ride vehicle seats may not be as accommodating to passengers of vastly different sizes, shapes, proportions, such as a tall adult or a small child. Thus, the ride experience of the passengers may be impacted. Therefore, it may be desirable to have a ride vehicle seat that can more comfortably contain and secure passengers on amusement park-style rides.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment, a ride vehicle system includes a seat configured to support a guest in a ride vehicle, the seat including a seat pan, and an adjustable pommel integrated with the seat pan, where the adjustable pommel is configured to transition between an extended configuration and a retracted configuration.

In accordance with an embodiment, a ride vehicle system includes a ride vehicle, a seat including a seat pan configured to support a guest within the ride vehicle, a restraint system configured to restrain the guest within the seat, and an adjustable pommel system. Further, the adjustable pommel system includes an adjustable pommel configured to extend from the seat pan to an extended position and configured to retract toward the seat pan to a retracted position and a pommel lock configured to retain the adjustable pommel in the extended position, the retracted position, or a position there between, wherein the pommel lock is configured to be actuated by a restraint lock configured to lock positioning of a restraint of the restraint system.

In accordance with an embodiment, a ride vehicle system includes a seat configured to support a guest in the ride vehicle. Moreover, the seat includes a seat pan, an adjustable pommel covered by a layer of elastic material, the elastic material coupled with and/or extending over the seat pan. Further, the seat includes a bladder or ratchet system of the adjustable pommel, wherein the bladder or ratchet system is configured to actuate to transition between an extended configuration and a retracted configuration of the adjustable pommel, wherein the adjustable pommel extends away from the seat pan in the extended configuration and retracts into or adjacent to the seat pan in the retracted configuration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
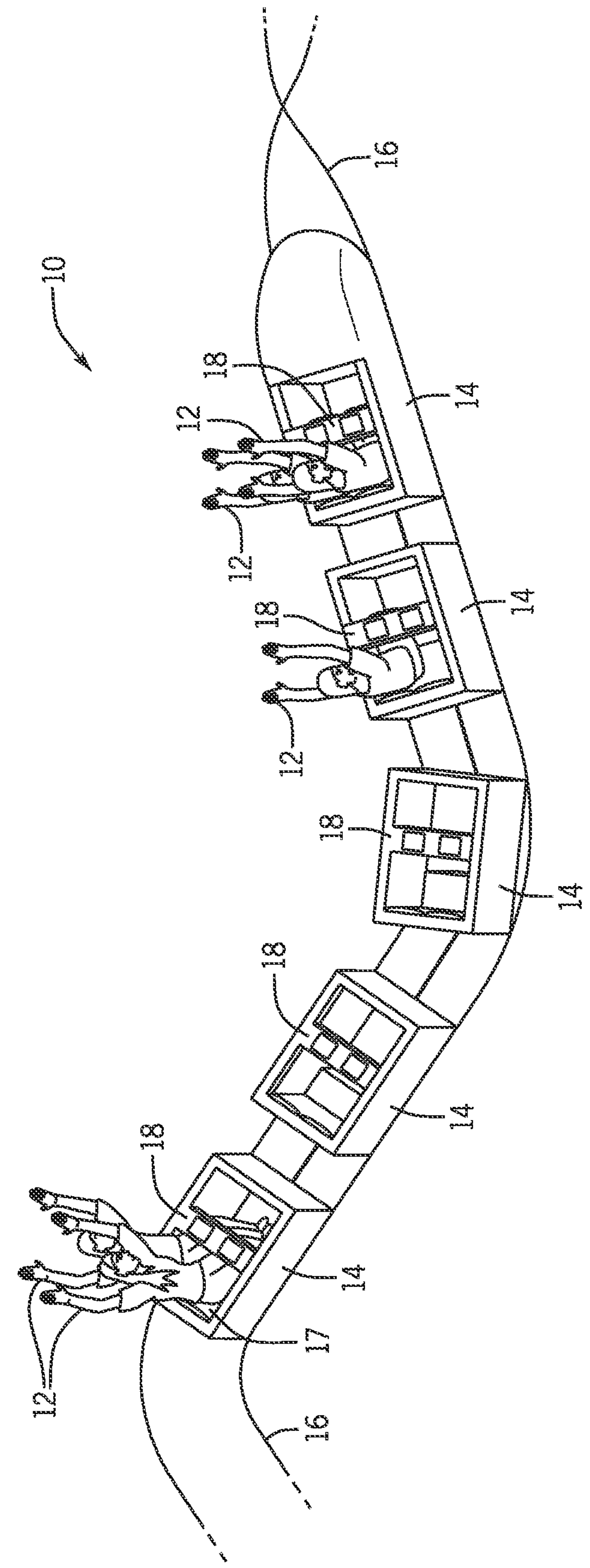
FIG. 1 is a side perspective view of an embodiment of a ride system including a rider engagement system with an adjustable pommel, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "approximately," "generally," "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as "parallel" and "perpendicular," should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

Amusement parks include many rides that provide unique and entertaining experiences for patrons or guests. In many instances, amusement park rides include one or more ride vehicles that follow a ride path, such as a track, through a series of features. As such, ride vehicle seats frequently include features to restrain and contain passengers in the ride vehicle seat while the ride vehicle is operating and throughout the duration of the ride experience. As will be appreciated, passengers of various ages, sizes, and proportions may wish to enjoy the same ride experience. Accordingly, it may be desirable for the ride vehicle seat to include an adjustable pommel that may accommodate passengers of a wide variety of body types, shapes, and sizes.

With the foregoing in mind, the systems described herein relate generally to an adjustable pommel for a ride vehicle seat of a ride system. Specifically, the disclosed adjustable pommel may be included in a seat pan and includes elements that are configured to closely conform to a wide variety of body types, shapes, and sizes. In other words, the disclosed adjustable pommel is adaptable and adjustable in shape and contour to enable the accommodation of differently sized ride passengers. For example, the adjustable pommel may be configured to transition between an extended configuration and a retracted configuration to conform to the body of a passenger. In one embodiment, the adjustable pommel may be at least partially covered by a layer of elastic material to facilitate a more comfortable experience for the passenger as the adjustable pommel transitions between the extended configuration and retracted configuration. In this manner, the wide range variety of body types, shapes, and sizes of the passengers may be accommodated, and the ride experience of the passengers may be improved.

In an embodiment in accordance with the present disclosure, the adjustable pommel may include an inflatable bladder system within an internal volume of the adjustable pommel. The inflatable bladder system may be configured to expand or deflate an inflatable bladder to facilitate the transition of the adjustable pommel toward the extended configuration or the retracted configuration. In another embodiment, the adjustable pommel may include a pommel body with teeth, which may be configured to engage with a ratchet that may move the adjustable pommel between the retracted configuration and the extended configuration. The pommel body with teeth may be referred to as a rack and the ratchet may be referred to as a pinion. Furthermore, the ride vehicle system may include any suitable locking mechanism. For example, the adjustable pommel including the pommel body with teeth may include a lock to hold the adjustable pommel in the extended configuration, the retracted configuration, or a position in between the extended configuration and the retracted configuration. Similarly, the inflatable bladder system may incorporate a valve as a lock to seal a desired amount of fluid within the bladder when locked, thus fixing the adjustable pommel in a desired configuration. Additional details with regard to the adjustable pommel and embodiments in which the adjustable pommel may accommodate the wide range variety of body types, shapes, and sizes of the passengers will be described below.

Turning now to the drawings, FIG. 1 depicts a side perspective view of an embodiment of a ride system 10 in accordance with aspects of the present disclosure. The ride system 10 may include a ride vehicle 14 that holds a number of passengers 12. The ride vehicle 14 may include a motion base (e.g., a Stewart platform or an active support with one or more degrees of freedom) that generates movement to create a thrilling or immersive experience for the passengers 12. In one embodiment, multiple ride vehicles 14 may be coupled (e.g., by one or more linkages) and travel along or about a ride path 16. The ride path 16 may be any surface on which the ride vehicle 14 travels. In the illustrated embodiment, the ride path 16 is a two-rail track. However, the illustrated ride path 16 may be representative of any of various different types of ride paths 16 (e.g., a single rail, an overhead rail, flooring, or grooves). The ride path 16 may or may not dictate the path traveled by the ride vehicle 14. That is, in one embodiment, the ride path 16 may control the movement (e.g., direction, speed, and/or orientation) of the ride vehicle 14 as it progresses, similar to a train on train tracks. In another embodiment, there may be a system for controlling the path taken by the ride vehicle 14. For example, the ride path 16 may be an open surface that allows the passengers 12 to control certain aspects of the movement of the ride vehicle 14 via a control system resident on the ride vehicle 14. Alternatively or additionally, the control system may be resident on the open surface, such that the passenger 12 may control the open surface to maneuver the ride vehicle 14 at a target trajectory.

Furthermore, the ride system 10 may include the ride vehicle 14 that may accommodate any number of passengers 12. For example, the illustrated embodiment shows five ride vehicles 14 that each accommodate two passengers 12. In another embodiment, the ride system 10 may include any number of ride vehicles 14. For example, the ride system 10 may include two, four, ten, twenty, or any number of ride vehicles 14, and each ride vehicle 14 may accommodate various ranges of passengers 12. For example, a first ride vehicle 14 may accommodate two passengers, a second ride vehicle 14 may accommodate four passengers 12, a third ride vehicle 14 may accommodate six passengers 12, and further ride vehicles 14 may accommodate any suitable numbers of passengers 12. As discussed in detail below, each ride vehicle 14 may contain one or more rider engagement systems 17 which may include an adjustable pommel 18, as discussed below. In one embodiment, the adjustable pommel 18 may be positioned between the legs of a passenger 12, such that the adjustable pommel 18 engages with each leg of the passenger 12 (e.g., in a frictional engagement) to aid in securing the passenger 12 to the rider engagement system 17 of the ride vehicle 14.

It should be appreciated that the embodiment of the ride system 10 illustrated in FIG. 1 is a simplified representation intended to provide context and facilitate discussion of the presently disclosed techniques. Other embodiments of the ride system 10, including the ride vehicle 14, the ride path 16, the adjustable pommel 18, and so forth may include similar and/or different elements or configurations.

Figure 2:
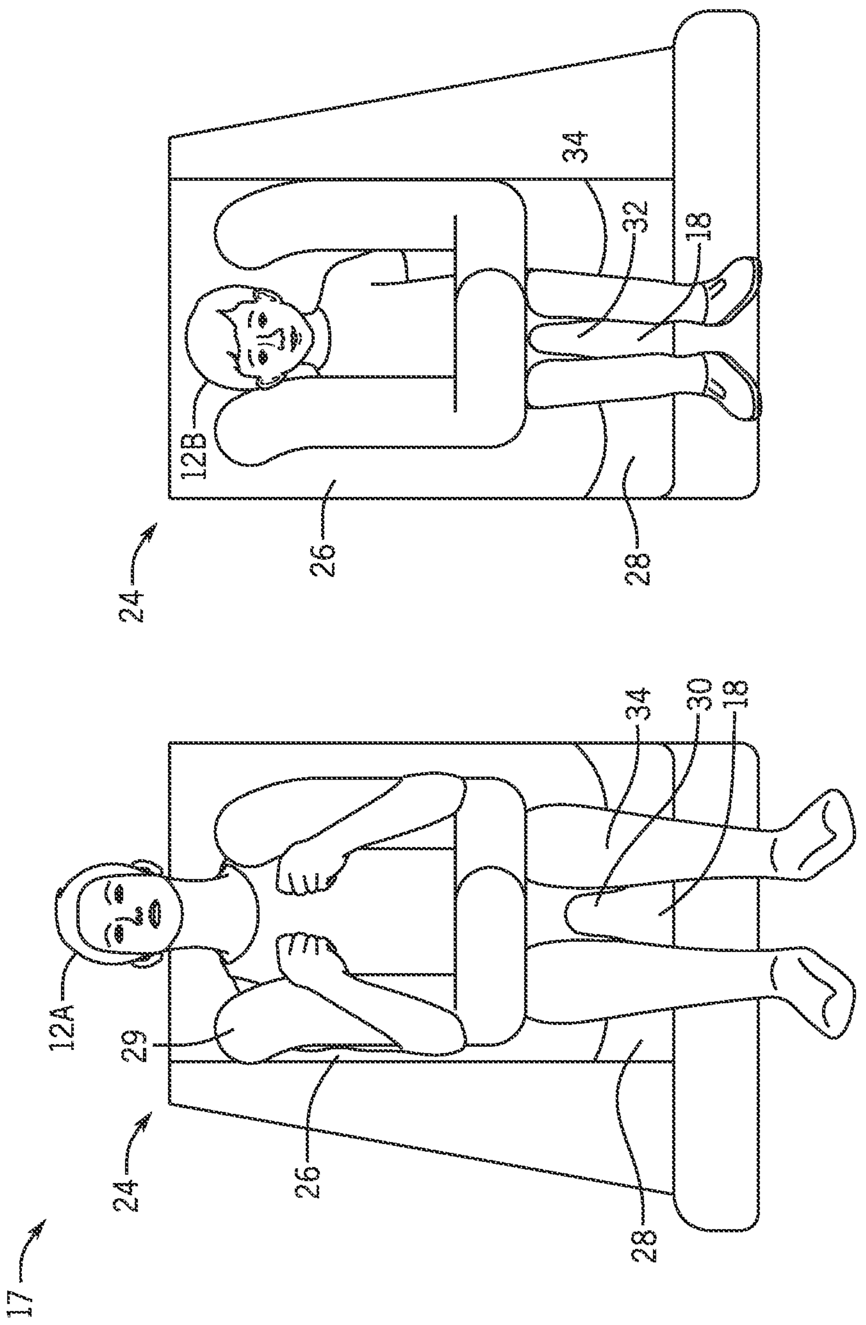
FIG. 2 is a perspective view of an embodiment of the rider engagement system of the ride system of FIG. 1, in accordance with aspects of the present disclosure.

FIG. 2 is a perspective view of an embodiment of the rider engagement system 17 including the adjustable pommel 18 of the ride system 10 of FIG. 1, in accordance with aspects of the present disclosure. As illustrated, the rider engagement system 17 may include a ride vehicle seat 24 which may include a seat back 26, a seat pan 28, a restraint system 29, and the adjustable pommel 18. The seat back 26 and the seat pan 28 may enable comfortable accommodation of the passenger 12 when seated. The restraint system 29 may operate to restrain the passenger 12 within the ride vehicle seat 24.

As disclosed herein, the adjustable pommel 18 may be configured to transition between a retracted configuration 30 and the extended configuration 32 to conform to the body of the passenger 12. As shown in FIG. 2, the passenger 12 may be an adult 12A seated in the ride vehicle seat 24 and the adjustable pommel 18 may retract (e.g., recede into the seat pan 28) into the retracted configuration 30, which may enable a more comfortable accommodation of the adult 12A. In addition, as shown in FIG. 2, the passenger 12 may be a child 12B seated in the ride vehicle seat 24 and the adjustable pommel 18 may extend (e.g., transition out of the seat pan 28) into the extended configuration 32, which may enable the more comfortable accommodation of the child 12B. In this manner, the rider engagement system 17 may enable additional securement for the adult 12A and/or the child 12B, as well as comfort.

In some embodiments, the seat pan 28 and the adjustable pommel 18 may be at least partially covered by a layer of elastic material 34 (e.g., elastic polymer, rubber, silicone, nylon, lycra, and so on) to enable protection of the passengers 12 as the adjustable pommel 18 retracts into the retracted configuration 30 or extends into the extended configuration 32. For example, when the passenger 12 sits on the seat pan 28 and the adjustable pommel 18 transitions into the retracted configuration 30 or the extended configuration 32, the elastic material 34 may facilitate a smooth transition and seal off internal workings of the adjustable pommel 18 from debris (e.g., dust and small particles). Thus, the layer of elastic material 34 may prevent undesired engagement of the internal workings of the adjustable pommel 18 with the passenger 12, which can provide a comfortable engagement with the passenger, while also preventing debris from affecting operation of the adjustable pommel 18. In another embodiment, the layer of elastic material 34 may form a seat cover on, or extending over, the seat pan 28, the adjustable pommel 18, and the seat back 26 of the ride vehicle seat 24 to uniformly cover the ride vehicle seat 24 in entirety.

Figure 3:
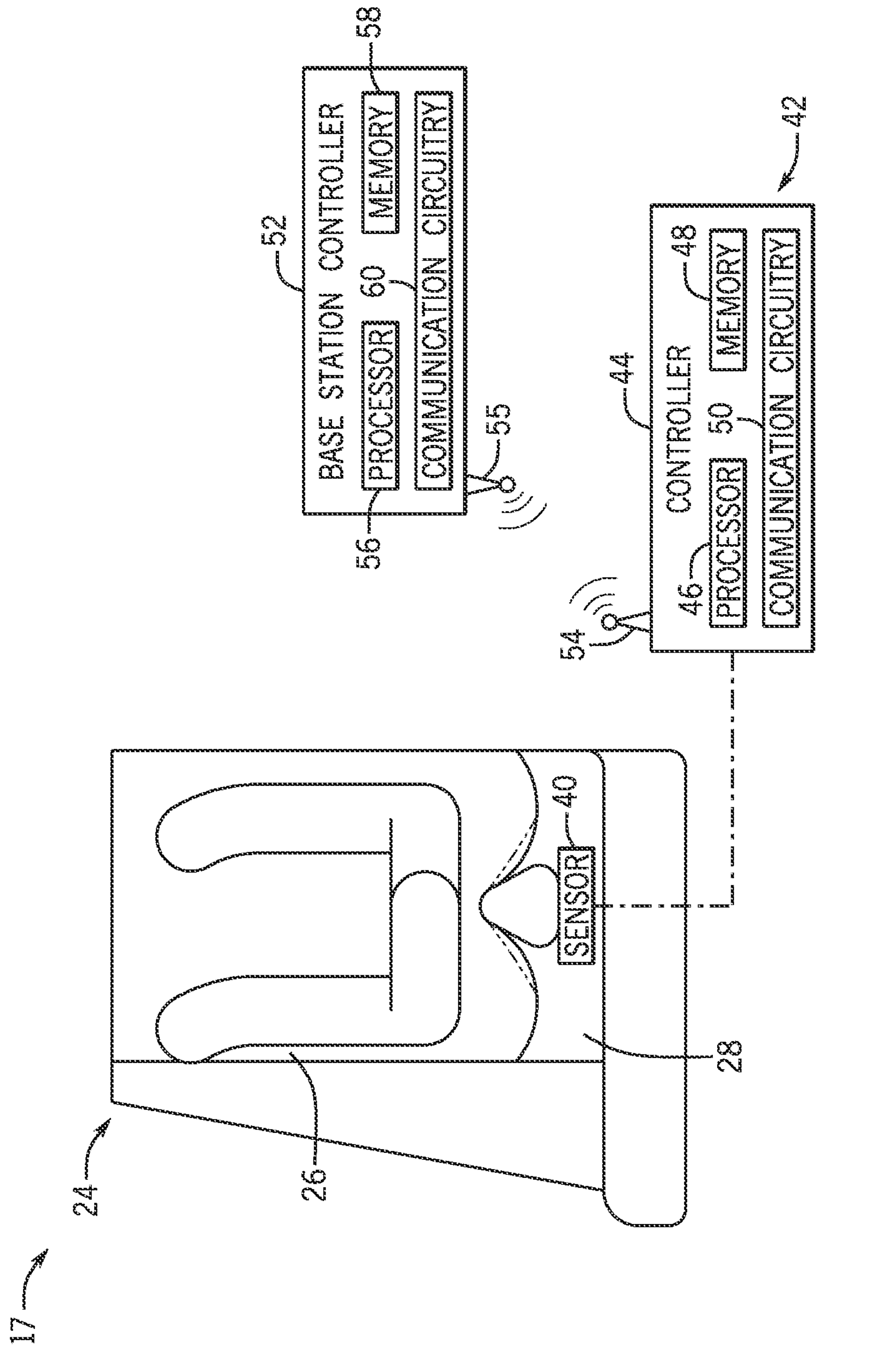
FIG. 3 is a schematic diagram of the rider engagement system that may accommodate one of the passengers of the ride system of FIG. 1, in accordance with aspects of the present disclosure.

With the foregoing in mind. FIG. 3 is a schematic diagram of the rider engagement system 17 that may accommodate one of the passengers 12 of the ride system 10 of FIG. 1, in accordance with aspects of the present disclosure. As shown, the ride vehicle seat 24 may include an embodiment of the adjustable pommel 18 configured to accommodate the passenger 12 within the ride vehicle seat 24 and/or within the ride vehicle 14. Additionally, as mentioned above, the ride vehicle seat 24 may include the seat back 26, the seat pan 28, and the restraint system 29.

In one embodiment, the ride vehicle seat 24 may be associated with a sensor 40, which may be representative of any number of sensors and sensor types. The sensor(s) 40 may be integrated in the ride vehicle seat 24, the seat back 26, the seat pan 28, on both sides of the adjustable pommel 18, and/or on a surface overlying the top of the adjustable pommel 18. In an embodiment, the sensor 40 is configured to detect the weight of one of the passenger 12 in the ride vehicle seat 24 and/or contact with the adjustable pommel 18 by the passenger 12 in the ride vehicle seat 24. The sensor 40 may include a passenger condition sensor (e.g. a pressure sensor, a weight sensor, a force sensor, a motion sensor, an image sensor, a touch sensor) used to measure the passenger's condition (e.g., physical conditions, height, weight, shape, size) and provide feedback to a controller 44 indicating the passenger's condition. The adjustable pommel 18 may be actuated based on the feedback received from the sensor 40. For example, a weight sensor may enable a determination of a range of weight values associated with the passenger 12. A weight value provided by the sensor 40 may be the basis for retracting, extending, or maintaining a position of the adjustable pommel 18. For example, when the weight value is greater than a threshold, the adjustable pommel 18 may at least partially collapse, and when the weight value is less than the threshold, the adjustable pommel 18 may remain in its current state or even extend. In an embodiment, the adjustable pommel 18 may be controlled based on a correlation (e.g., a linear or exponential correlation) with the weight value. In another example, a pressure sensor may enable detection of a level of contact with the passenger 12, such as a force applied to the adjustable pommel 18 by the passenger 12 and this may facilitate transitioning the adjustable pommel 18 between configurations to provide comfort to the passenger 12 while also providing secured engagement with the passenger 12.

In one embodiment, the rider engagement system 17 may include a control system 42. The control system 42 may include a controller 44, which may be representative of a single controller or multiple separate controllers cooperating together (e.g., operating together as a unit). Each rider engagement system 17 may be associated with the respective controller 44. In one embodiment, the controller 44 may be a central controller that controls numerous rider engagement systems 17. In another embodiment, the controller 44 may control one rider engagement system 17. The controller 44 may include one or more processors 46, memory 48, and one or more communication systems 50 (e.g., communication circuitry).

Additionally, it should be noted that the rider engagement system 17 may include a base station controller 52 that may facilitate control of the control system 42. The base station controller 52 may represent one or more controllers, such as a single controller operating alone or multiple controllers operating together. The base station controller 52 may include one or more processors 56, memory 58, and one or more communication systems 60. In one embodiment, the controller 44 and the base station controller 52 may be communicatively coupled via respective transmitters, receivers, and/or transceivers (e.g., transceiver 54 and transceiver 55) that enable wireless communication across any suitable protocol. In another embodiment, the controller 44 and the base station controller 52 are communicatively coupled via a wired (e.g., landline, fiberoptic cable(s)) connection. The controller 44 and/or the base station controller 52 may serve as a quality check point, whereby conditions of the rider engagement system 17 are monitored. For example, the base station controller 52 may receive data from the controller 44 and/or the sensor 40 on the ride vehicle seat 24, on the adjustable pommel 18, or the like. Such data may be utilized to determine force being applied to the adjustable pommel 18, whether the adjustable pommel 18 is in a locked configuration or unlocked configuration, or whether the adjustable pommel 18 may be actuated (e.g., whether a ride status allows for adjustment of the adjustable pommel 18). Depending on detected conditions, (e.g., if the adjustable pommel is in an unlocked configuration), the controller 44 and/or base station controller 52 may control actuation of the adjustable pommel 18 (e.g., lock the adjustable pommel 18 in place). Furthermore, an operator of the base station controller 52 may manually control the adjustable pommel 18 and instruct the adjustable pommel 18 to enter the retracted configuration 30, the extended configuration 32, a locked configuration, or an unlocked configuration of the adjustable pommel 18.

The processor 46 of the controller 44 and/or the processor 56 of the base station controller 52 may be used to execute software, such as software for locking or unlocking the adjustable pommel 18. Furthermore, the processor 46 and/or the processor 56 may determine a start and end time associated with a ride on the rider engagement system 17. The processor 46 and/or the processor 56 may be any type of computer processor or microprocessor capable of executing computer-executable code. The processor 46 and/or the processor 56 may also include multiple processors that perform the operations described herein.

The memory 48 of the controller 44 and/or the memory 58 of the base station controller 52 may include a volatile memory, such as random access memory (RAM), and/or a nonvolatile memory (ROM). The memory 48 and/or the memory 58 may store a variety of information and may be used for various purposes. For example, the memory 48 may store processor-executable instructions, such as instructions for controlling components of the ride vehicle 14. The memory 48 and/or the memory 58 may also include flash memory, or any suitable optical, magnetic, or solid-state storage medium, or a combination thereof. The memory 48 and/or the memory 58 may store data, instructions (e.g., software or firmware for controlling the configuration of the adjustable pommel 18), and any other suitable information.

The communications system 50 of the controller 44 and the communications system 60 of the base station controller 52 may be a wired or wireless communication component that may facilitate communication between the control system 42 and the base station controller 52, and/or various other computing systems via the transceiver 54 and the transceiver 55 or via a network (e.g., via Internet, Bluetooth, Wi-Fi).

Figure 4:
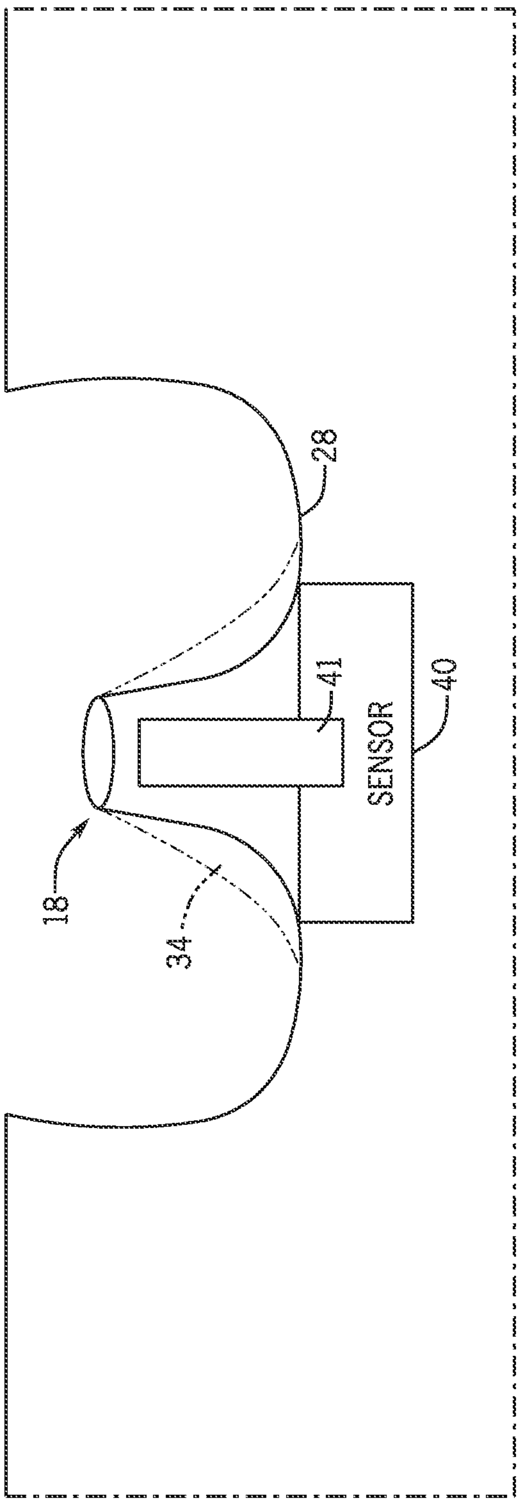
FIG. 4 is a schematic cross-sectional view of an embodiment of the rider engagement system having the adjustable pommel of the ride system of FIG. 1, in accordance with aspects of the present disclosure.

FIG. 4 is a schematic cross-sectional view of an embodiment of the rider engagement system 17 having the adjustable pommel 18 of the ride system of FIG. 1. As disclosed herein, the adjustable pommel 18 and/or the seat pan 28 may be at least partially covered by the layer of elastic material 34. Further, it should be noted that the seat pan 28 may be modified to have different contours to accommodate different passenger body types and specialized for various types of rides. Indeed, the different contours of the seat pan 28 may guide the passenger 12 as to the positioning of the legs of the passenger 12. In this manner, the different contours may enable the passenger 12 to sit in a position that does not interfere with the adjustment of the adjustable pommel 18. Further, the different contours may aid in notifying the passenger 12 if they are not sitting in a proper position because the different contours may cause discomfort if the passenger 12 is seated incorrectly. The passenger 12 may sit on the seat pan 28 within the ride vehicle seat 24 and the legs of the passenger 12 may each go over a respective side of the adjustable pommel 18. The adjustable pommel 18 may include an adjuster 41 that facilitates adjustable engagement of the adjustable pommel 18 with the passenger 12. For example, the adjuster 41 may include a passive biasing device (e.g., a spring or pressurized cavity) or an active biasing device (e.g., a hydraulic actuator, a mechanical lever, or a pump and pressurization cavity). The adjustable pommel 18 may be designed to respond to the level of engagement with the passenger 12. For example, as the adjuster 41, the adjustable pommel 18 may include springs or other biasing mechanisms (e.g., pressurized fluid) that resist force applied by the engagement with the passenger but also comply (e.g., flex into a more contracted configuration) to facilitate comfortable engagement. Additionally, or alternatively, in an embodiment, the ride vehicle seat 24 may include the sensor 40, which may enable detection of the weight of the passenger 12 and/or contact with the adjustable pommel 18 by the passenger 12, which may be utilized by a controller (e.g., the controller 44) to actively control the adjuster 41, which may be in the form of one or more actuators, to achieve a desired engagement between the adjustable pommel 18 and the passenger 12.

Figure 5:
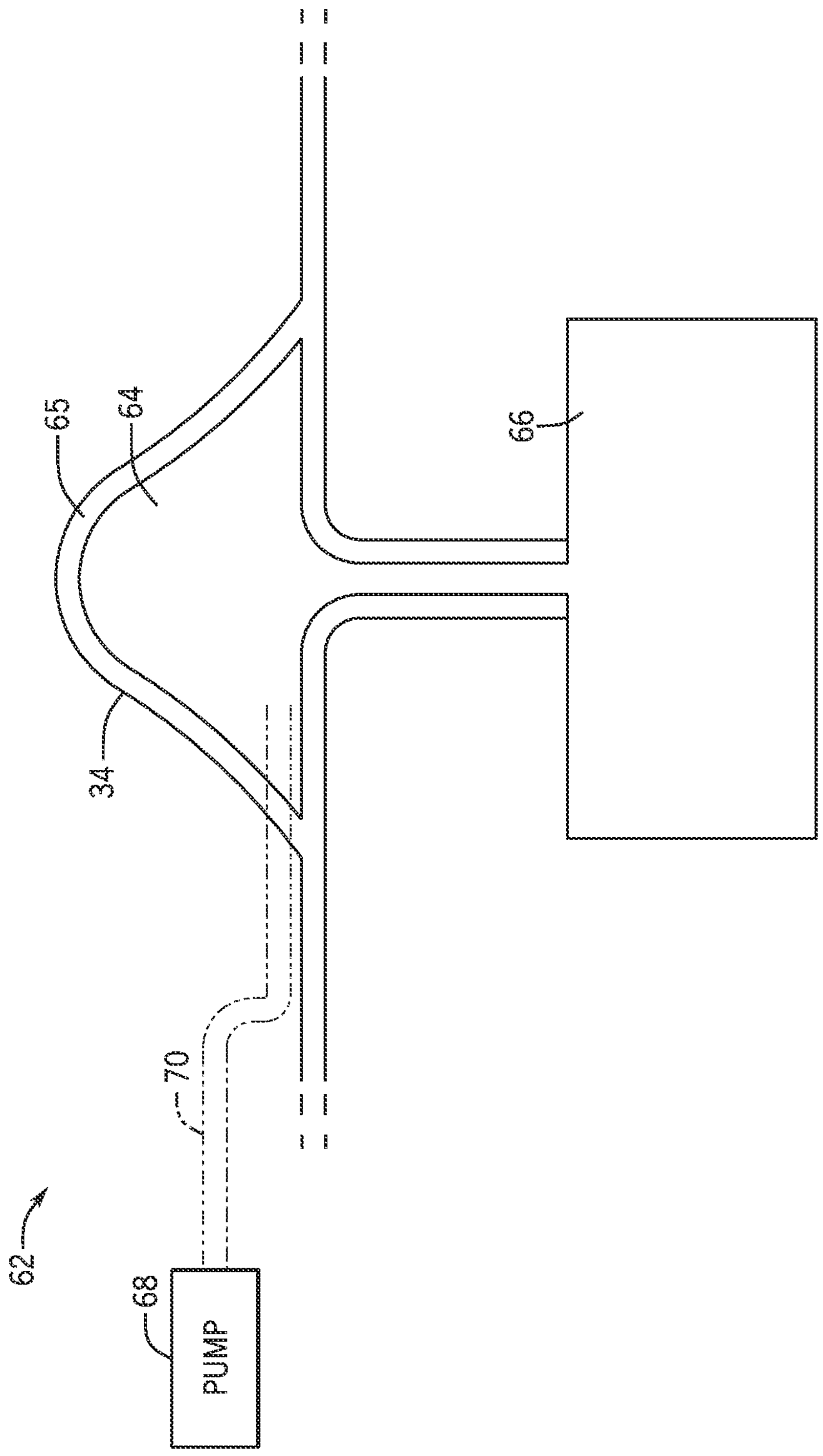
FIG. 5 is a schematic cross-sectional view of an embodiment of the adjustable pommel of the ride vehicle system having an inflatable bladder system, in accordance with aspects of the present disclosure.

FIG. 5 is a schematic cross-sectional view of an embodiment of the adjustable pommel 18 of the rider engagement system 17 having an inflatable bladder system 62. As illustrated, the adjustable pommel 18 may include an inflatable cavity or bladder 64 within an internal volume of the adjustable pommel 18. Additionally, the adjustable pommel may be at least partially covered by the layer of elastic material 34. The inflatable bladder 64 may include elements configured to enable the adjustable pommel 18 to expand and transition to the extended configuration 32 and deflate to transition to the retracted configuration 30. The walls of the inflatable bladder 64 may include a resilient structure (e.g., rubber, silicone, and so on) configured to be biased toward the expanded configuration 32. That is, the walls of the inflatable bladder 64 may be formed such that the walls themselves are biased toward a particular shape (forming the extended configuration 32) and, when deformed out of the particular shape they generate forces that push and/or pull themselves back into the particular shape, thus providing passive biasing toward the extended configuration 32. The walls of the inflatable bladder 64 may be designed to push/pull themselves toward the particular shape in a particular direction, such as a vertical direction (e.g., up or down) and/or a horizontal direction (e.g., left and/or right). In this manner, the inflatable bladder 64 may enable flexibility and adaptability of the adjustable pommel 18 as it transitions into respective configurations based on applied pressure by the passenger 12 when sitting on the ride vehicle seat 24. In one embodiment, the adjustable pommel 18 may include an additional inflatable cavity 65 positioned between the inflatable bladder 64 and an exterior surface of the adjustable pommel 18. The additional inflatable cavity 65 may provide additional comfort for the passenger 12 as the adjustable pommel 18 transitions into respective configurations. Further, the inflatable bladder 64 and/or the additional inflatable cavity 65 may be filled with a gas, a fluid (e.g., water, beanbag filler, air, gas mixture, etc.), or a gel to provide a desired texture, density, support level, or the like.

The inflatable bladder 64 may be coupled to a reservoir 66 to allow the gas, fluid, or air to transition to and from the reservoir 66 as the adjustable pommel 18 transitions to conform to the passenger 12. The walls of the reservoir 66 may be a more rigid flexible material (e.g., a rigid rubber). As the inflatable bladder 64 expands with the gas or the fluid within the internal volume, the adjustable pommel 18 may also expand and conform to the passenger 12. Similarly, as the inflatable bladder 64 deflates, the adjustable pommel 18 deflates to conform to the passenger 12. The inflatable bladder 64 may operate based on pressure applied by the passenger 12 while sitting in the ride vehicle seat 24. For example, the passenger 12 having a certain weight may sit on the adjustable pommel 18 thus causing fluid to flow out of the inflatable bladder and into the reservoir 66 (increasing pressure within the reservoir 66) to promote contouring of the adjustable pommel 18 to the passenger 12. Further, the rigid flexible material of the walls of the reservoir 66 may allow the reservoir to expand as the fluid flows into the reservoir 66 and return to its original shape when the pressure from the passenger 12 is released such that the fluid is directed out of the reservoir 66 and back into the inflatable bladder 64.

In one embodiment, the inflatable bladder 64 and the reservoir 66 with which it is communicatively coupled define a closed system that is completely sealed away from the environment such that fluid within the closed system must remain within one or both of the inflatable bladder 64 and the reservoir 66. In another embodiment, inflation or deflation of the inflatable bladder 64 may be achieved via a pump 68 (or a compressor). For example, the pump 68 may be coupled to the ride vehicle seat 24 in the rider engagement system 17. Further, the pump 68 may be disposed within the base of the ride vehicle seat 24, or in another suitable location, such as within a frame of the ride vehicle seat 24, coupled to the seat back 26, or on a rear face of the ride vehicle seat 24 (e.g., a face of the seat back 26 opposite the passenger 12), or elsewhere. A passage 70 (e.g., a hose) may extend from the pump 68 to the inflatable bladder 64 disposed within the adjustable pommel 18 to enable the transfer of gas (e.g., pressurized gas), liquid, or gel from the pump 68 to the inflatable bladder 64. In yet another embodiment, the pump 68 may apply constant pressure to the inflatable bladder 64, to maintain pressurization of the inflatable bladder 64 and enable the adjustable pommel 18 to retain its shape. When a larger pressure is applied to the inflatable bladder 64 than is being applied by the pump 68, then the gas, fluid, or gel may deflate from the inflatable bladder 64. An embodiment employing the pump 68 may include the reservoir 66 or exclude the reservoir 66. Further, in an embodiment wherein the pump 68 employs air to pressurize the inflatable bladder 64, the air may be allowed to escape to the environment and the pump 68 may pull from the environment to refill the inflatable bladder 64. It should be noted that additional elements of the inflatable bladder system 62 (e.g., controllers, power supplies, etc.) may be incorporated into the adjustable pommel 18, the ride vehicle seat 24, and/or the rider engagement system 17.

In one embodiment, the inflatable bladder system 62 may include the sensor 40 configured to provide feedback to the rider engagement system 17. For example, the sensor 40 may be configured to provide feedback indicative of an operating parameter of the inflatable bladder system 62 (e.g., a pressure of the gas within the inflatable bladder 64), and/or feedback related to contact with the passenger 12 (e.g., the force applied to the inflatable bladder 64 by the passenger 12). The level of contact applied to the adjustable pommel 18 by the passenger 12 and detected by the sensor 40 (e.g., a contact sensor) may enable the inflatable bladder system 62 to achieve a desired interface. For example, if the passenger 12 is the child 12B, a smaller force may be applied to the inflatable bladder 64 than by the adult 12A, thus causing the inflatable bladder 64 to expand to the desired interface for the child 12B and achieve a desired pressure level. In another embodiment, the sensor 40 may be the contact sensor that detects a level of contact by the passenger 12, which may be confirmed by a separate sensor on the rider engagement system 17.

Figure 6:
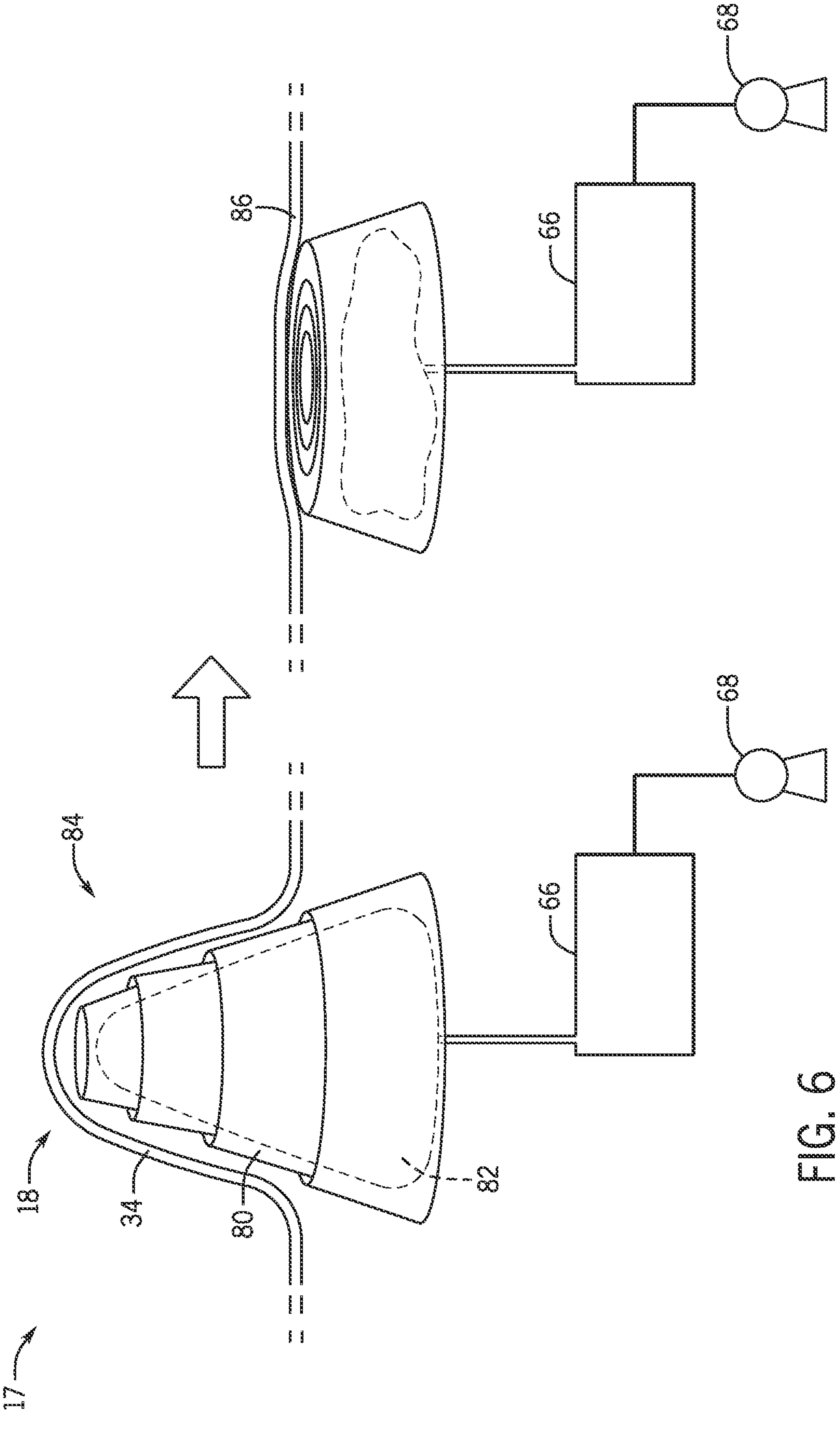
FIG. 6 is a perspective view of an embodiment of the adjustable pommel of the ride vehicle system having nested shells transitioning from an expanded configuration to a retracted configuration, in accordance with aspects of the present disclosure.

FIG. 6 is a perspective view of an embodiment of the adjustable pommel 18 of the rider engagement system 17 having nested shells 80 that may have a circular shape or any other cross-sectional shape and/or any combination thereof (e.g., square, ellipse, diamond, triangle, polygon) transitioning from an expanded configuration 32 to a retracted configuration 30, in accordance with aspects of the present disclosure. It may be desirable to have extra skeletal support for the adjustable pommel 18, such as a telescoping structure, incorporated into the adjustable pommel 18 and the nested shells 80 illustrated in FIG. 6 may serve this purpose. The adjustable pommel 18 may be at least partially covered by the layer of elastic material 34. The nested shells 80 may be disposed about a bladder 82 such that inflation of the bladder 82 may cause the nested shells 80 to telescope outwardly 84 (e.g., expand outwardly) and deflation of the bladder 82 may cause the nested shells 80 to contract toward a concentric configuration 86 (e.g., retract inwardly). The nested shells 80 may be made of plastic, wood, metal, rubber, or any suitable material that may allow the nested shells 80 to expand or retract within each other. The nested shells 80 may utilize any desirable shape and may include tongues, grooves, slides, hooks, lips, and so forth to keep the individual shells within desired configuration envelopes relative to one another (e.g., to prevent disengagement between respective shells). In the illustrated embodiment, this is partially achieved by using conical shapes that overlap such that a smaller conical shape (or frustrum) has a larger base than the opening of the larger conical shape through which it partially extends. However, the illustrated conical shapes are also round to allow rotation with respect to one another, which may allow for consistent engagement and case of transitioning between configurations.

The nested shells 80 may be integrated with or surround the bladder 82 such that when the bladder 82 changes configurations, the nested shells 80 also change configurations, while providing additional structural support for the adjustable pommel 18. For example, when pressure is applied to the adjustable pommel 18, fluid may transition from the bladder 82 to the reservoir 66 such that the bladder 82 deflates allowing the nested shells 80 to collapse into each other. Further, as mentioned above, the walls of the reservoir 66 may be the more rigid flexible material such that the reservoir may expand as the fluid transitions into the reservoir 66 due to pressure applied by the passenger 12, and transition back to its original shape when the passenger 12 removes the pressure allowing the fluid to return to the bladder 82. When fluid returns to the bladder 82, the nested shells 80 may be forced to telescope into an expanded configuration. In another embodiment, the inflation or deflation of the bladder 82 may be achieved by the pump 68, which may work to apply constant pressure to the bladder 82 to allow the adjustable pommel 18 to be shaped by the delta is pressure applied by the pump 68 and the pressure applied by the passenger 12. Regardless, the nested shells 80 may transition configurations along with the bladder 82 while providing an additional layer of structural support.

As illustrated in FIG. 6, the nested shells 80 may incorporate features that form concentric circular bodies, with larger concentric circular bodies surrounding smaller concentric circular bodies. Additionally, the nested shells 80 may essentially share the same center. When less pressure (e.g., force) is applied to the adjustable pommel 18 by a passenger 12, the nested shells 80 may telescope outwardly 84 extending away from the seat pan 28 based on pressure applied by a pressure source (e.g., the pump 68 or the reservoir 66) to the bladder 82. In this manner, the nested shells 80 may extend out to provide support for and conform to the lower appendages of the passenger 12. When more pressure is applied to the adjustable pommel 18 by the passenger 12, than is being applied to the bladder 82 by the pump 68, then the nested shells 80 may retract into the seat pan 28 toward the concentric configuration 86 to not interfere with the passenger 12 sitting on the ride vehicle seat 24. The nested shells 80 may transition back into telescoping outwardly 84 after the constant pressure by the passenger 12 sitting on the ride vehicle seat 24 is removed. In this manner, the adjustable pommel 18 may conform and adjust based on the weight and pressure applied by the passenger 12 to the bladder 82 and return to its original shape when the pressure is removed. It should be noted that the nested shells 80 may be formed of flexible material (e.g., plastic) to allow for deformation inwardly and a more accommodating engagement with the passenger 12. Further, the bladder 82 may be external to the nested shells 80 or some other telescoping structure. Further still, two bladders 82 may be employed on the inside and outside of such a telescoping structure (e.g., the nested shells 80).

Figure 7:
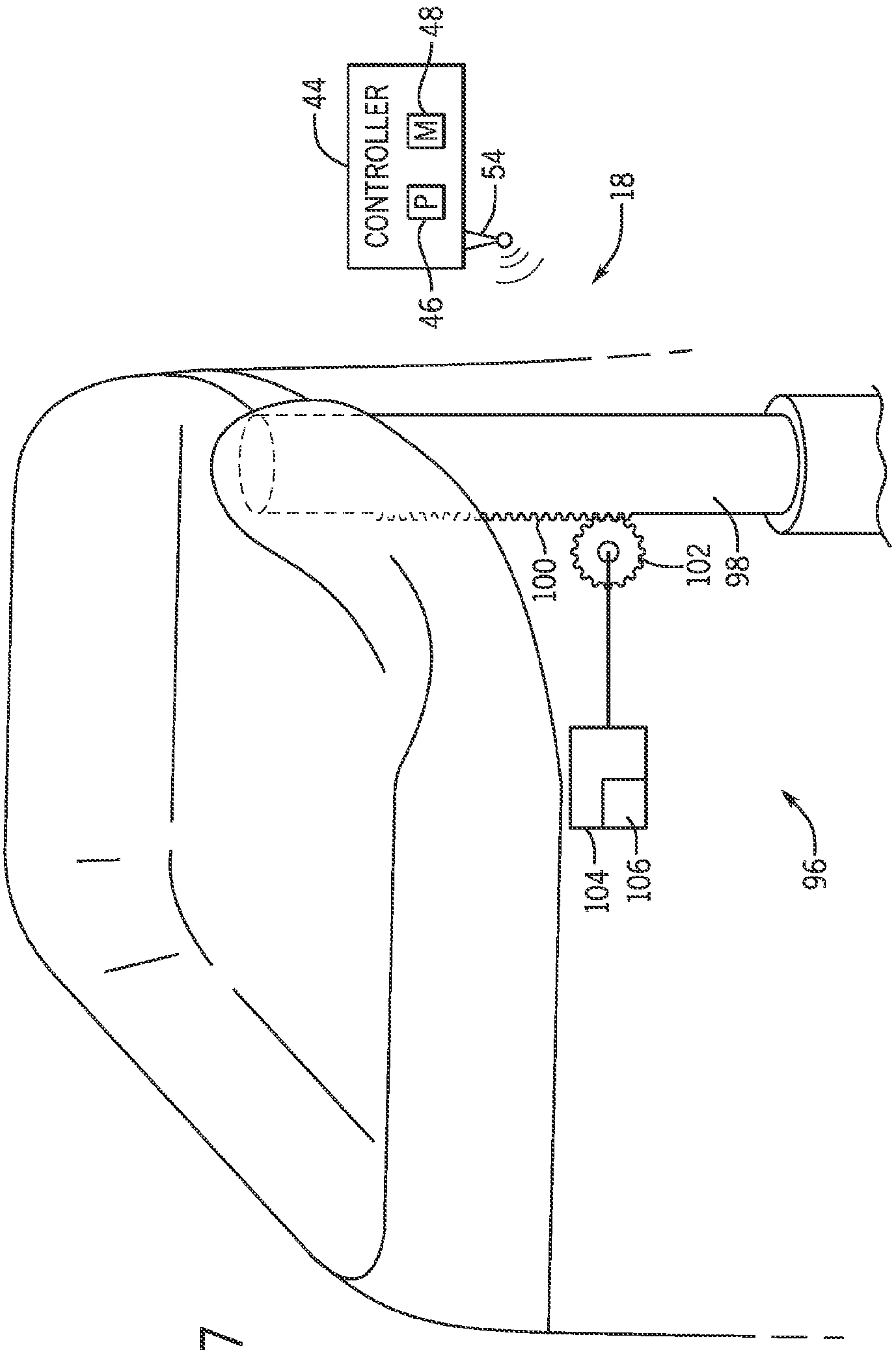
FIG. 7 is a perspective view of an adjustable pommel associated with the rider engagement system, the adjustable pommel including a locking mechanism, in accordance with aspects of the present disclosure.

In one embodiment, the rider engagement system 17 may include a locking mechanism 96 (e.g., a pommel lock) configured to prevent movement of the adjustable pommel 18 once the passenger 12 is situated. FIG. 7 is a perspective view of the adjustable pommel 18 associated with the rider engagement system 17, the adjustable pommel 18 including the locking mechanism 96, in accordance with aspects of the present disclosure. In one embodiment, a pommel body 98 may include a plurality of teeth 100 within the adjustable pommel 18. The pommel body 98 may be configured to engage with a ratchet 102 to facilitate movement between the retracted configuration 30 and the extended configuration 32. The ratchet 102 may be driven in a forward or reverse direction to impart up or down motion to the pommel body 98 due to the resulting interaction of the ratchet 102 and the teeth 100.

The ratchet 102 may be coupled to one or more coils 104 configured to provide a force on the adjustable pommel 18 in an outward direction. It should be understood that the one or more coils 104, may include or represent any suitable devices capable of applying force in certain embodiments, such as motors, elastomers, gas struts, springs, or any combination thereof. As mentioned above, the one or more coils 104 may apply a constant force in the upward direction on the adjustable pommel 18. The force applied by the one or more coils 104 may be overcome by force applied by the passenger 12 when the passengers sits in the ride vehicle seat 24. In this manner, the adjustable pommel 18 may transition between the retracted configuration 30 and the extended configuration 32 based on a delta between the force applied by the passenger 12 and the force applied by the one or more coils 104. The locking mechanism 96 may also include a brake 106 coupled to the ratchet 102 or configured to directly engage the teeth 100. The brake 106 may be initiated to lock the ratchet 102 into place and/or to lock the pommel body 98 into place (e.g., directly or via the ratchet 102) based on a ride status. For example, the locking may be initiated when the ride is about to begin operation (e.g., start moving along or about a track or start a series of motions). Therefore, the brake 106 resists or blocks movement between the retracted configuration 30 and the extended configuration 32. As such, the brake 106 may enable the adjustable pommel 18 to be held in a position securely throughout a ride.

In one embodiment, the controller 44 may be communicatively coupled to the locking mechanism 96, for example, via respective transceivers 54. The controller 44 may receive an indication that the adjustable pommel 18 is in the unlocked configuration and may need to be locked due to an attraction cycle beginning. The controller 44 may then instruct the locking mechanism 96 to lock. For example, the controller 44 may send a locking signal instructing the locking mechanism 96 to engage the locking mechanism 96 into the locked configuration (e.g., a suitable engagement position to accommodate the passenger 12). Additionally, the controller 44 may send an unlocking signal instructing the locking mechanism 96 to transition the locking mechanism 96 into the unlocked configuration when the ride is completed.

In one embodiment, the sensor 40 may enable detection of whether the adjustable pommel 18 is in the locked configuration or the unlocked configuration. In yet another embodiment, the locking mechanism 96 (e.g., the pommel lock) may be actuated by a restraint lock within the restraint system 29. In this manner, the restraint lock may lock the positioning of a restraint within the restraint system 29 and simultaneously lock the locking mechanism 96.

It should be noted that while, in the illustrated embodiment, the locking mechanism 96 includes the ratchet 102, the locking mechanism 96 may be a hydraulic system, a series of solenoids and pins, an electromagnetic lock, among other suitable locking mechanisms. For example, the locking mechanism 96 may include a valve that prevents fluid from entering or exiting the bladder 82. Furthermore, the rider engagement system 17 may incorporate any combination of these locking mechanisms into the adjustable pommel 18.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride vehicle system, comprising:

a seat configured to support a guest in a ride vehicle, the seat comprising:

a seat pan; and an adjustable pommel integrated with the seat pan, wherein the adjustable pommel is configured to extend from the seat pan in an extended configuration and retract toward the seat pan in a retracted configuration.

2. The ride vehicle system of claim 1, wherein the seat pan and the adjustable pommel are at least partially covered by a layer of elastic material.

3. The ride vehicle system of claim 2, wherein the layer of elastic material forms a seat cover extending on or over the seat pan, the adjustable pommel, and a seat back of the seat.

4. The ride vehicle system of claim 1, comprising:

one or more sensors configured to provide feedback associated with a passenger in the seat; and a controller configured to receive the feedback and instruct one or more actuators to actuate the adjustable pommel based on the feedback.

5. The ride vehicle system of claim 4, wherein the one or more sensors are configured to provide the feedback based on a detected level of contact with the passenger, a detected force applied by the passenger, or both.

6. The ride vehicle system of claim 4, wherein the one or more sensors comprises a pressure sensor disposed on the adjustable pommel.

7. The ride vehicle system of claim 1, comprising an inflatable bladder disposed within an internal volume of the adjustable pommel, wherein the inflatable bladder is configured to expand to facilitate transition of the adjustable pommel toward the extended configuration and deflate to facilitate transition of the adjustable pommel toward the retracted configuration.

8. The ride vehicle system of claim 7, wherein the inflatable bladder comprises a structure configured to be biased toward an expanded configuration of the inflatable bladder.

9. The ride vehicle system of claim 7, wherein the inflatable bladder is disposed within the internal volume that is communicatively coupled with a reservoir such that fluid can transition between the inflatable bladder and the reservoir.

10. The ride vehicle system of claim 7, comprising a pump configured to maintain, increase, or decrease pressurization of the inflatable bladder, a reservoir communicatively coupled to the inflatable bladder, or both.

11. The ride vehicle system of claim 1, comprising one or more sensors configured to detect contact with a passenger in the seat and an inflatable bladder system configured to inflate a bladder of the adjustable pommel with a fluid to achieve a desired interface with the passenger based on a level of the contact detected by the one or more sensors.

12. The ride vehicle system of claim 11, wherein the inflatable bladder system comprises a pump configured to transfer the fluid into the bladder to achieve a desired pressure level detected by the one or more sensors.

13. The ride vehicle system of claim 1, comprising an inflatable bladder system configured to inflate a bladder of the adjustable pommel by controlling flow of a gel, air, or liquid into and out of the bladder.

14. The ride vehicle system of claim 1, wherein the adjustable pommel comprises nested shells disposed about a bladder such that inflation of the bladder causes the nested shells to telescope outwardly and deflation of the bladder causes the nested shells to contract toward a concentric configuration.

15. The ride vehicle system of claim 1, wherein the adjustable pommel comprises a pommel body with teeth configured to engage with a ratchet, wherein the ratchet is configured to actuate to move the adjustable pommel between the retracted configuration and the extended configuration.

16. The ride vehicle system of claim 1, wherein the adjustable pommel comprises a lock configured to hold the adjustable pommel in the extended configuration, the retracted configuration, or a position between the extended configuration and the retracted configuration.

17. A ride vehicle system, comprising:

a ride vehicle;

a seat comprising a seat pan configured to support a guest within the ride vehicle;

a restraint system configured to restrain the guest within the seat; and an adjustable pommel system, comprising:

an adjustable pommel configured to extend from the seat pan to an extended position and configured to retract toward the seat pan to a retracted position; and a pommel lock configured to retain the adjustable pommel in the extended position, the retracted position, or a position there between, wherein the pommel lock is configured to be actuated by a restraint lock configured to lock positioning of a restraint of the restraint system.

18. The ride vehicle system of claim 17, wherein the adjustable pommel comprises an inflatable bladder configured to expand to transition the adjustable pommel toward the extended position and configured to deflate to transition the adjustable pommel toward the retracted position.

19. The ride vehicle system of claim 17, wherein the adjustable pommel comprises a telescoping support structure.

20. A ride vehicle system, comprising:

a seat configured to support a guest in a ride vehicle, the seat comprising:

a seat pan;

an adjustable pommel covered by a layer of elastic material, the layer of elastic material coupled with and/or extending over the seat pan; and a bladder or ratchet system of the adjustable pommel configured to actuate to transition between an extended configuration and a retracted configuration of the adjustable pommel, wherein the adjustable pommel extends away from the seat pan in the extended configuration and retracts into or adjacent to the seat pan in the retracted configuration.

* * * * *